Patented Oct. 4, 1949

2,483,513

UNITED STATES PATENT OFFICE 2,483,513

PRODUCTION OF BASIC LINEAR POLYMERS

Sidney James Allen and James Gordon Napier Drewitt, London, England, assignors, by mesne assignments, to Celanese Corporation of America, a corporation of Delaware No Drawing. Application April 19, 1946, Serial No. 663,626. In Great Britain April 12, 1944

6 Claims. (Cl. 260—78)

This application is a continuation in part of application S. No. 591,408 filed May 1, 1945.

This invention relates to improvements in the production of polymers, and is more particularly concerned with the production of polymers suitable for the manufacture of filaments, films and plastic materials, and with the production of coating compositions, moulding powders, plastics, foils, films, sheets, filaments and other articles therefrom.

We have discovered that very valuable basic linear polymers may be obtained by condensing a dibasic carboxylic acid or its equivalent with a polyamine containing two primary amino groups and one or more secondary amino groups, the reagents being used in substantially equimolecular proportions. It appears that the reactivity of the primary amino groups of the polyamine is so marked as compared with that of the secondary amino groups that the former can react while the latter remain unchanged. This observation is of very considerable importance since not only does it open up a new field of monomeric reagents suitable for the production of linear polyamides but in addition it enables polyamides to be produced which have very desirable basic properties. The invention comprises broadly, therefore, the production of linear polymers by reacting in substantially equimolecular proportions a dibasic carboxylic acid or its equivalent with a diamine containing two primary amino groups and one or more secondary amino groups.

In a number of cases, as will be described more fully below, by continuing the condensation, the linear polymer first obtained can be changed into an insoluble or cross-linked polymer. These basic insoluble polymers, while not of value for the production of filaments, films and the like, as referred to above, nevertheless have value, for example in absorbing the acid radicle from aqueous liquors containing salts, acids or the like.

While such polyamines as diethylene triamine, triethylene tetramine, tetraethylene pentamine and 1.6-bis-β-aminoethyl - amino - hexane diamine, NH$_2$CH$_2$CH$_2$NH(CH$_2$)$_6$NHCH$_2$CH$_2$NH$_2$, may be used for the purpose of the present invention, we prefer to use polyamines in which the primary amino groups are separated by more than two, and preferably more than three, atoms from the secondary amino groups in the same molecule. Bodies of this type include dihexylene triamine (prepared from excess of hexamethylene diamine and phthalimidohexyl chloride), 1.2-bis-ω-aminohexyl-amino-ethane and similar polyamines prepared by any of the methods referred to below. 4.4'-diamino-diphenylamine is a further example of a suitable polyamine. The following methods are available for forming polyamines suitable for the present invention.

(a) One very suitable method consists in reacting an α-ω-paraffin dihalide, for example ethylene dibromide, 1.4-dibrombutane, 1.6-dibromhexane and the like, with an excess, and preferably a very considerable excess, such as 20 moles, of an α-ω-diamino-paraffin, for example tetramethylene diamine, pentamethylene diamine, hexamethylene diamine and the like.

(b) Similarly an amino-nitrile in excess may be reacted with an α-ω-paraffin dihalide, and the resulting diamino-dinitrile may then be reduced by standard methods to the tetramine. Convenient reagents include 6-amino-capronitrile on the one hand and the paraffin dihalides mentioned above on the other hand.

(c) Again, a halogen nitrile in excess may be reacted with an α-ω-diamino-paraffin, and the resulting dinitrile again reduced to the tetramine. Suitable diamines are those mentioned under (a) above, while as halogen nitriles we may use 7-brom-heptano-nitrile, 6-chlor-capronitrile and 4-chlor- or brom-butyro-nitrile.

(d) The same type of tetramine may be formed by addition of two moles of acrylonitrile or methacrylonitrile to an α-ω-diamino-paraffin, followed by reduction of the resulting alkylene bis-β-imino-propionitrile or alkylene bis-β-isobutyro-nitrile.

(e) Lastly, α-ω-paraffin dihalides, for instance those mentioned under (a) above, may be condensed with two moles of a mono-acidylated diamine, for example mono-acetyl hexamethylene diamine, and the resulting compound treated to split off the acidyl groups. The mono-acidylated diamine should be used in considerable excess.

The dibasic carboxylic acids may be used in the free state or in the form of an ester, halide or amide, or, if water is present, as the nitrile. Suitable reagents include oxalic acid or its esters, halides or amide, urea, urethanes or dialkyl or diaryl carbonates, and the following dicarboxylic acids or their equivalents: adipic acid, pimelic acid, suberic acid, azelaic acid, sebacic acid and the like. It is not necessary to use a dibasic acid in which the two acid groups are united solely by carbon atoms, and the invention includes dibasic acids in which the acid groups are united by a chain containing non-reactive atoms other than carbon, including oxygen, sulphur and tertiary nitrogen, as for example in diglycollic acid, thiodiglycollic acid and N-methyl-imino-diacetic acid and N-methyl-imino-dipropionic acid.

The invention further includes using the above polymer-forming reagents together with other linear polyamide-forming reagents, for example diamines with dicarboxylic acids or mono-amino-monocarboxylic acids. For example we may use a mixture of a polyamine of the type described, a diprimary amine and a dicarboxylic acid. In calculating the proportions of reagents to be used, one molecule of combined polyamine and diamine should be condensed with substantially one molecule of dicarboxylic acid. In other words, the carboxylic acid groups present in the mixture should be substantially equivalent to the primary amino groups present in the mixture. In all forms of the invention, the proportion of dicarboxylic acid falls substantially short of that which is equivalent to the primary and secondary amino groups combined.

The best polymers are those produced by condensation of a dibasic carboxylic acid or its equivalent with a polyamine containing two primary amino groups and one or two secondary amino groups. In this series of polymers, linear polymers are easily formed from oxalic ester and any of the polyamines previously mentioned, and indeed so far we have not encountered a single case in which the polymerisation has led to a cross-linked product. While the proportion of the polyamine should not be substantially more than equimolecular to the oxalic ester, the proportion of the oxalic ester may be raised a little above equimolecular with regard to the polyamine, say to 10% above, without affecting substantially the nature of the polymer obtained. With higher acids, for example adipic acid and its higher homologues as mentioned above, the position is, however, different. Here continued heating of the dicarboxylic acid with the polyamine does result in cross-linking and in the production of an insoluble polymer. In this case it is necessary, where a linear polymer is required, to stop the condensation before this cross-linking sets in. We have found that this is not very difficult, and in many cases we can produce linear polymers which require heating for several more hours before cross-linking occurs.

Normally in the production of polymers from bifunctional reagents, the intrinsic viscosity of the linear polymer appears to be a good index of the degree of polymerisation and of the ability of the polymer to form good films or to form filaments. This also appears to be the case when oxalic ester is condensed with polyamines of the type in which the primary amino groups are separated from secondary amino groups by more than three atoms. In other condensations covered by the present invention, however, and particularly those which use the higher dicarboxylic acids, there appears to be some anomaly about the viscosity, and in the result the viscosity is no longer a good index of the ability of the polymer to form filaments. This may be illustrated by the case of condensing 1.6-bis-$\beta$-aminoethyl-aminohexane with adipic acid. It is found, for example, that if an equimolecular mixture of these two bodies be heated at 155° C. for 15 hours, the product, which is still soluble in metacresol, has an intrinsic viscosity, measured as a 1% solution in metacresol, of the order of 0.6–0.7. Normally a polymer having such a viscosity would already be filament-forming and the filaments would be capable of being cold-drawn. With this polymer, this is not the case, and at this stage the ability to form fibres has not yet appeared. It is partly for this reason that we prefer to use polyamines of which the primary amino groups are separated by more than two, and preferably more than three, atoms from the secondary amino groups.

In all the reactions discussed above in which condensations are carried out between carboxylic and amino groups, the carboxylic groups may be replaced by equivalent radicles, for example carboxylic ester groups, both alkyl and aryl esters, by carboxylic amide, by carboxylic halide groups or by nitrile groups (together with water). Similarly amino groups may be replaced by acidylamino groups containing acidyl radicles which are readily replaced, for example the formyl radicle. Further, instead of using compounds containing primary amino groups, corresponding compounds containing isocyano or isothiocyano groups may be employed, the reaction with a carboxylic acid then involving the elimination of carbon dioxide or carbon oxysulphide instead of water. Condensations between amino, acidylamino, isocyano or isothiocyano groups and carboxylic acid, carboxylic ester, carboxylic amide groups or nitrile groups (with water) may be brought about by heating, generally to temperatures of the order of 100–300° C., in order to obtain a polymer of sufficiently high molecular weight to be fibre-forming. In some cases, particularly when using oxalic ester, the initial stages of the condensation may be carried out at a temperature much lower than 100° C. For example, the reaction of oxalic ester with diethylene triamine, triethylene tetramine and the like begins at room temperature. Where a reagent is employed which is volatile at the temperature of condensation, the initial stages of the condensation may be carried out under pressure or reflux so as to prevent the removal of such a volatile reagent from the sphere of action.

The condensation may be carried out with or without a diluent, in the latter case preferably while melting the monomeric substances or the low polymers obtained after the condensation has been carried some way. Where a diluent is used, it is preferably a solvent for the resulting polymer, for example a phenolic solvent such as phenol itself, the cresols and xylenols. Conveniently the solvent or diluent is so chosen that it boils at the desired polymerisation temperature, so that the condensation, at least in its initial stages, may be carried out at atmospheric pressure while boiling. Where a volatile body such as water or ethyl alcohol is split off during the condensation, it is desirable, as the condensation proceeds, to apply vacuum or alternatively a current of inert gas, so as to promote the condensation. It is sometimes desirable to employ a condensation catalyst with a view to carrying out the reaction at a lower temperature than would otherwise be possible. A very small proportion of phosphoric acid, for example of the order of .01 to .1% of the reagents, is usually sufficient for this purpose. To avoid discolouration, it is in all cases desirable to exclude air, so that the condensation may, for example, be carried out in the presence of oxygen-free nitrogen or other inert gas.

Reactions involving the elimination of hydrochloric acid, for example reactions between carboxylic halide groups and amino groups, may be brought about at quite considerably lower temperatures, but usually towards the end of the reaction, in order to produce bodies of high molecular weight, it is necessary to heat up the reagents well above the temperature at which the initial reaction can take place. Furthermore, it is preferable to have present during such an elimination of a hydrohalide acid a reagent which will absorb or neutralise the acid, for example an inorganic base or a tertiary organic base.

The invention includes the production of filaments, films and other articles from the polymers produced as described above. In forming filaments, the choice of the method of spinning depends in part on the properties of the polymers. Where solutions in organic solvents can readily be produced, dry spinning methods may be employed with solutions in volatile solvents, and wet spinning methods with solutions in volatile or even comparatively non-volatile solvents. Polymers having a basic character may be wet spun from acid solution. The polymers can be spun by melt spinning methods, i. e. by extruding a melt of the polymer through suitable orifices. In general the temperature of the polymer to be extruded should be some 10-30° above the melting point of the polymer. This melting temperature may be modified to some extent by mixing the polymer with suitable proportions of plasticisers, for example sulphonamide plasticisers, phenolic plasticisers, urea and thiourea plasticisers and the like. Such plasticisers may either be left in the products or may be partially or completely extracted therefrom.

The filaments, if formed from a polymer of sufficiently high molecular weight, may be drawn out at comparatively low temperatures, or even at atmospheric temperature, to very fine filaments having high tenacity and good elasticity. The resulting filaments may then be used for any of the purposes to which artificial silks have in the past been applied.

While the invention is especially directed to the manufacture and application of fibre-forming polymers, it is not limited thereto and embraces the production of similar linear polymers suitable, for example, for use as softening agents, coatings, film-forming substances, and the like, and as already referred to, includes the continuation of the condensation to produce basic insoluble polymers. Moreover, for the above applications, the linear polymers of the present invention may be mixed with other fibre-forming, film-forming or lacquer substances or other ingredients, for example cellulose acetate, acetobutyrate, butyrate and aceto-stearate, ethyl cellulose, oxyethyl cellulose, oxyethyl cellulose acetate, benzyl cellulose and other cellulose derivative, plasticisers or softening agents, dyestuffs, pigments and the like.

The polymers being basic in character have a good affinity for acid wool dyes, so that filaments, and yarns and fabrics containing them, as well as other articles containing the polymers may readily be dyed or otherwise coloured with such dyestuffs.

The polymers, especially in the form of filaments or other structures or in any other form, may be after-treated by means of various reagents with the object of changing their properties, for instance increasing the melting point and/or making them insoluble in organic solvents. The secondary amino groups disposed along the polymer chain are particularly useful for this purpose. Thus, for instance, the polymers may be treated with formaldehyde or other aldehyde, with a mono-, di- or poly-basic acid saturated or unsaturated or its equivalent, such as the acid chloride, with sulphuryl chloride, acrylonitrile, acrylic ester, carbon disulphide, a di-isocyanate, especially an alkylene di-isocyanate, an alkylene dihalide or the like.

The following examples illustrate the invention but are not to be considered as limiting it in any way. It should be noted that in the examples dealing with the production of polymers the precise degree of reaction, and hence the intrinsic viscosity and molecular weight, depend upon a number of factors, for example the temperature, the pressure, the ratio of surface to volume, the rate of flow of inert gas through the system and the general design of the apparatus in so far as this affects the ease with which volatile by-products of the polymerisation reaction are eliminated. Accordingly the details given in these examples can only be taken as a general guide to the manner in which the invention can be carried out.

EXAMPLE 1

*Preparation of 1:2-bis-ω-aminohexylamino-ethane*

18.8 parts of ethylene dibromide in 40 parts of 95% ethanol were added to a mixture of 232 parts of hexamethylene diamine and 150 parts of 95% ethanol at 80-90° C., and the mixture held at this temperature for 3 hours, care being taken to avoid access of atmospheric carbon dioxide. To the cold mixture was added 11.2 parts of caustic potash in 50 parts of 95% ethanol and the precipitated potassium bromide was filtered off. The alcohol was removed from the filtrate by distillation at 50 mms., and most of the excess diamine recovered by distilling at 20 mms. Distillation was then continued at a pressure between 0.5 and 5 mms. and gave a fore-run consisting of hexamethylene diamine (boiling about 60°/1 mm.) and a good yield of 1:2-bis-ω-aminohexylamino-ethane hydrate as a fraction boiling about 175°/0.5. This fraction set to an almost colourless solid. The tetramine hydrate, which contained 1-2 moles of water according to the precise conditions of the distillation, could be recrystallised from petrol ether or from a small amount of water. The dihydrate had m.70°. Prolonged heating of the hydrate under air condensed reflux at 200°/1 mm., followed by vaccum distillation, gives the substantially anhydrous base, but it is not necessary to isolate the material in this form for the condensation.

The amine formed a tetra-benzene-sulphonyl derivative M. P. 168° and a derivative with 3 moles of benzaldehyde, 1:3-bis (6-benzylidene-amino-hexyl)-2-phenyl - tetrahydro - imidazole M. P. 70°.

EXAMPLE 2

*Condensation of 1:2-bis-(ω-aminohexylamino)-ethane with adipic acid*

7.3 parts of adipic acid (1 molecular proportion) and 15.4 parts of tetramine hydrate (containing 12.9 parts, 1 molecular proportion of pure tetramine) were mixed in 8 parts of methanol. The methanol was removed by heating in a stream of hydrogen and the residue heated in a current of hydrogen for 22 hours at 150°, then for 2 hours at 195° followed by 2 hours at 195° under 10 mms. pressure. The resultant polymer was a translucent, rather pliable solid soluble in m-cresol and formic acid, insoluble in acetone and benzene and swollen in methanol. The intrinsic viscosity (1% solution in m-cresol) was about 0.9, it had M. P. 150-155° and from the melt gave pliable fibres with cold-drawing properties. Elementary analysis of this polymer confirmed the structure

[—(CH₂)₄CO.NH.(CH₂)₆.NH(CH₂)₂.NH(CH₂)₆.NH.CO—]ₙ

Much the same result was obtained by effecting the polymerisation throughout at 195–200° for 4 hours. On the other hand, further heating of the above polymers at 195–200° gave an infusible, tough cross-linked polymer, insoluble in but swollen by m-cresol and formic acid.

Similar products to the linear and cross-linked polymers mentioned above were obtained when adipic acid was replaced by suberic acid (M. Pt. of linear polymer about 150°) or sebacic acid (M. Pt. of linear polymer about 145°).

The presence of free secondray amino groups in the linear adipic/tetramine polymer was demonstrated by the formation of a nitroso derivative by treatment with nitrous acid in dilute sulphuric acid. This nitroso derivative, an almost white, fibrous polymer, gave a strong Liebermann reaction and decomposed on heating from about 150° upwards. Unlike the original polymer it was insoluble in dilute hydrochloric acid.

EXAMPLE 3

*Condensation of 1:2-bis-ω-aminohexylaminoethane with ethyl oxalate*

13.8 parts of the tetramine monohydrate (1 molecular proportion) were dissolved in 120 parts of 95% ethanol, 7.3 parts of ethyl oxalate (1 molecular proportion) added, and the mixture refluxed for 5 hours. The ethanol was then distilled off in a stream of hydrogen and the residue heated in a current of hydrogen at 165° for 2 hours. The polymeric product remained as a hard, horny mass, somewhat resembling ivory. Its I. V. (1% solution in m-cresol) was about 0.3 and the M. P. about 140°. It showed incipient fibre-forming properties.

Using the same procedure as above, but heating for 10 hours at 165°, with or without a further 3 hours at 180°/1 mm., gave a polymer of I. V. 0.5–0.6, M. Pt. about 150–5°. This polymer was slowly soluble in m-cresol and rapidly soluble in formic acid. It readily formed pliable fibres with marked cold-drawing properties. Elementary analysis of the polymer indicated the structure

[—CO.CO.NH(CH₂)₆NH(CH₂)₂NH(CH₂)₆NH—]ₙ

Polymers of much the same properties were obtained using 0.94 molecular proportions instead of the 1.0 molecular proportion of tetramine, other conditions being the same.

The above polymer, intrinsic viscosity ca. 0.55–0.6, could be melt-spun satisfactorily at a melt temperature of 170–5° using a spinneret having an orifice of 0.15–0.25 mm. to form lustrous, pliable monofils with good cold drawing properties.

EXAMPLE 4

*Condensation of urea with 1:2-bis-(ω-aminohexylamino)-ethane*

2.78 parts tetramine hydrate (corresponding to 2.58 parts, 1 molecular proportion of pure tetramine) were dissolved in 12 parts ethanol and 0.6 part (1 molecular proportion) of urea added. The mixture was refluxed for 5 hours, the ethanol removed in a stream of hydrogen and the residue heated in a current of hydrogen at 120° for 2 hours and at 155° for 3 hours. The polymer remaining, which had the appearance of ivory, had M. Pt. 110°, intrinsic viscosity (1% in m-cresol) about 0.4 and was soluble in formic acid, ethanol and m-cresol but insoluble in benzene. Elementary analysis accorded fairly well with the structure

[—CO.NH.(CH₂)₆NH(CH₂)₂NH(CH₂)₆NH—]ₙ

EXAMPLE 5

*Condensation of di-hexylene triamine with oxalic ester*

The dihexylene triamine for this condensation was prepared by one of the methods described in U. S. Application S. No. 672,329, filed May 25, 1946, namely by condensing phthalimidohexyl chloride with a very large excess of hexamethylene diamine, removing excess diamine hydrolysing the residue containing the phthalyl triamine and isolating the free base by distillation B. Pt. 155°/ca. 0.2 mm. 2.15 parts (1 molecular proportion) of the triamine in 10 parts of ethanol were mixed with 1.46 parts (1 molecular proportion) of ethyl oxalate in 8 parts of ethanol and the mixture refluxed for 5 hours in hydrogen. The ethanol was then distilled off and the residue heated in a current of hydrogen for 1 hour at 200° C. and 2 hours at 220°. The resultant fibre-forming polymer had M. Pt. ca. 190–195°, was soluble in m-cresol and formic acid but insoluble in ethanol and acetone. Its water resistance was better than that of the product of Example 3.

EXAMPLE 6

*Condensation of di-hexylene triamine with suberic acid*

2.15 parts (1 molecular proportion) of the triamine in 10 parts of ethanol were mixed with 1.74 parts (1 molecular proportion) of suberic acid in 12 parts of ethanol. The solvent was distilled off and the residue heated in a current of hydrogen for 2 hours at 155° to give an ivory-like, moderately hard polymer M. Pt. 160–70°, intrinsic viscosity (1% in m-cresol) ca. 0.45, soluble in formic acid and m-cresol, insoluble in acetone. After a further 0.5 hour at 195° the polymer was a hard, transparent glass, M. Pt. ca. 165°, soluble in formic acid. It gave cold-drawable fibres from the melt. Still further heating at the same temperature gave an infusible, cross-linked, transparent glass, swollen by, but insoluble in, formic acid and m-cresol.

EXAMPLE 7

*Mixed polymer from hexamethylene diamine, ethyl oxalate and 1:2-bis-(ω-aminohexylamino)-ethane*

2.76 parts of tetramine hydrate (corresponding to 2.58 parts, 0.5 molecular proportion of pure tetramine), and 1.16 parts of hexamethylene diamine (0.5 molecular proportion) in 18 parts of ethanol were mixed with 2.92 parts of ethyl oxalate (1 molecular proportion). The mixture was refluxed for 5 hours, the alcohol distilled off and the residue heated in a current of hydrogen for 12 hours at 255° and 1 hour at 282°. The resultant polymer had M. Pt. ca 225°, intrinsic viscosity (1% in m-cresol) ca. 0.4, was soluble in m-cresol and formic acid and insoluble in acetone and ethanol.

Example 8

After-treatment of fibres

The following treatments were all applied to undrawn fibres obtained as in Example 3.

(a) Ethyl oxalate

The fibre was heated with 10 parts of ethyl oxalate for 1 hour at 130° C., the excess oxalate decanted after cooling and the fibres washed with acetone and dried. The weight increase was 20%. The treated fibres had cold-drawing properties, did not fuse on holding at 200° for 1 minute, fused partially after 1 minute at 250° and were of considerably improved resistance to boiling water.

(b) Carbon disulphide

The fibre was refluxed in 10 parts carbon disulphide for 3 hours, excess disulphide decanted and the fibres then heated in nitrogen at 100° for 2 hours and 130° for 0.5 hour. The weight increase was about 15%. The treated fibres were of considerably enhanced resistance to boiling water and softened from 180° upwards.

(c) Ethyl carbonate

The fibre was refluxed with 10 parts of ethyl carbonate for 6 hours, the reagent decanted hot and the fibre washed with acetone and dried. The treated material fused only slightly, if at all, after 1 minute at 250°.

Example 9

After-treatments of films with maleic acid

Film cast from a methanol solution of the adipic acid/tetramine polymer of Example 2 was immersed in a 2% solution of maleic acid in acetone for 1–5 minutes. It was then washed with acetone and baked at 120–125° for 16 hours. The film was now infusible and insoluble in methanol, formic acid, dilute hydrochloric acid and m-cresol.

The term I. V. in the above examples refers to the intrinsic viscosity, which is measured by the following ratio:

$$\log_e \eta r / c$$

where $\eta r$ is the relative viscosity of a solution of the polymer of the stated concentration in meta-cresol, and $c$ is the concentration of the solution in grams per 100 cubic centimetres of solution.

In the appended claims, the dicarboxylic acid equivalents e. g. ester, halide or amide, and the amine equivalents, e. g. the formylamino group, are included in the phrase "amide-forming derivatives of the acid" or "the amine" as the case may be.

Having described our invention, what we desire to secure by Letters Patent is:

1. Process for the production of basic linear polyamides, which comprises heat reacting a polyamine containing two and only two primary amino groups and at least one secondary amino group and whose primary amino groups are its sole reacting groups, the primary amino groups being separated from each secondary amino groups present by at least 2 atoms with a substantially equimolecular quantity of oxalic ester until a fiber-forming polymer is produced.

2. Process for the production of basic linear polyamides, which comprises heat reacting a polyamine containing two and only two primary amino groups and at least one secondary amino group and whose primary amino groups are its sole reacting groups, the primary amino groups being separated from each secondary amino group present by at least three atoms, with a substantially equimolecular quantity of oxalic ester until a fiber-forming polymer is produced.

3. Process for the production of basic linear polyamides, which comprises heat reacting a tetramine of the formula $$NH_2(CH_2)_xNH.CH_2CH_2NH.(CH_2)_xNH_2$$

where $x$ is more than three and whose primary amino groups are its sole reacting groups with a substantially equimolecular quantity of oxalic ester until a fiber-forming polymer is produced.

4. Process for the production of basic linear polyamides which comprises heat reacting 1:2-bis-ω-aminohexyl-amino-ethane with a substantially equimolecular quantity of oxalic ester and continuing the reaction until the fiber-forming polymer is produced.

5. A linear fiber-forming polymer obtained by the process of claim 1.

6. A linear fiber-forming polymer obtained by the process of claim 4.

SIDNEY JAMES ALLEN.
JAMES GORDON NAPIER DREWITT.

REFERENCES CITED

The following references are of record in the file of this patent:

UNITED STATES PATENTS

| Number | Name | Date |
| --- | --- | --- |
| 2,314,972 | Dreyfus | Mar. 30, 1943 |
| 2,325,567 | Bock et al. | July 27, 1943 |
| 2,374,354 | Kaplan | Apr. 24, 1945 |